July 13, 1937.     L. E. CLEMENT     2,087,019
PROCESS FOR THE PRECIPITATION OF COLLOIDAL SOLUTIONS
Filed May 18, 1934
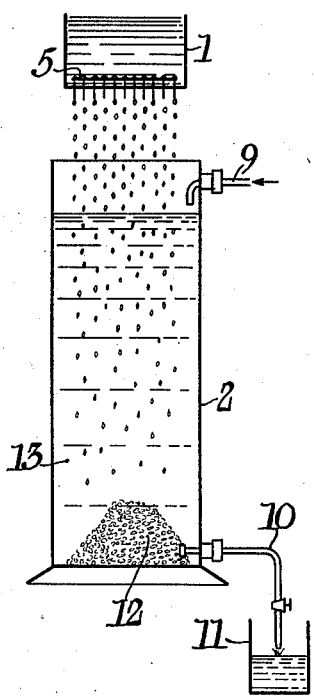
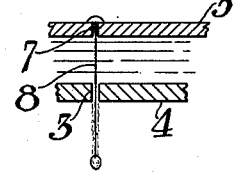
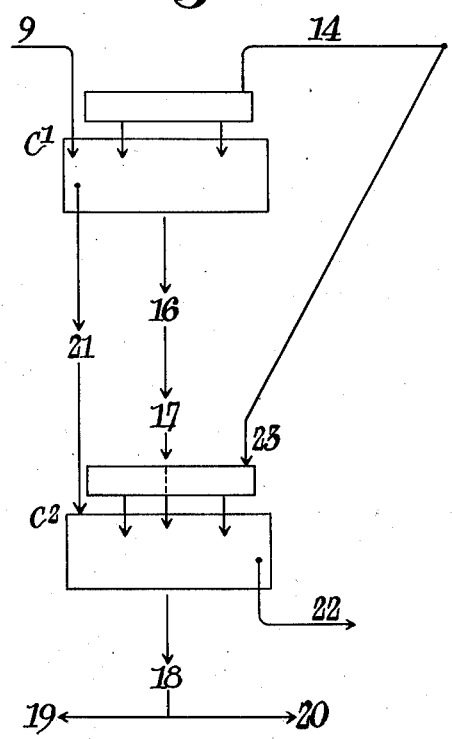
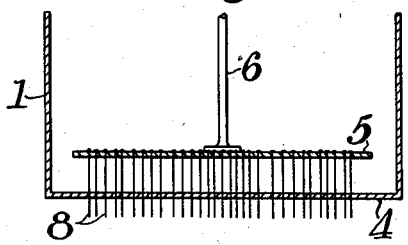
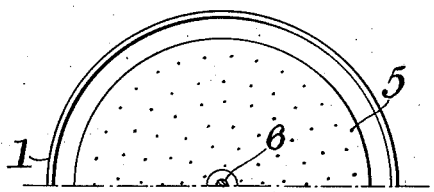
Inventor:
Louis E. Clement,
Newton M. Perrins
Daniel J. Mayne
By                Attorneys Patented July 13, 1937

2,087,019

UNITED STATES PATENT OFFICE 2,087,019

PROCESS FOR THE PRECIPITATION OF COLLOIDAL SOLUTIONS

Louis Etienne Clement, Meudon-Val-Fleury, France, assignor, by mesne assignments, to Eastman Kodak Company, Jersey City, N. J., a corporation of New Jersey Application May 18, 1934, Serial No. 726,354
In France August 22, 1933

4 Claims. (Cl. 18—48)

It is known that in the manufacture of colloidal materials, such for example as cellulose derivatives, artificial resins, etc., which may be transformed into industrial products, the treatment with reagents is effected on the first material so that it becomes dissolved. In the present case a colloidal solution is formed which is more or less thick and is then precipitated in an appropriate precipitating liquid, first to obtain the dissolved material in solid form and in a finely divided state which facilitates its manipulation and ultimate solution and, second, to recover the reagents which it is necessary to eliminate from the material and which collect in the precipitating liquid.

Thus, in the case of the manufacture of cellulose acetate, the cellulose dissolves in the esterification bath. When the acetylation is ended, and after the subsequent treatments, such as saponification, the colloidal solution containing the acetocellulose and solvent is precipitated in a precipitating liquid to obtain a colloidal material in solid form and in a divided state and to eliminate the solvent which collects in the precipitating liquid and is then recovered. But, according to the methods usually used, the precipitation of the acetocellulose is difficult. In fact, from the addition of the precipitating liquid to the acetylation solution, a gelatinous precipitate is formed which, hardening little by little, becomes impermeable. Inside the mass so formed, the acetic solution is pasty and unsolidified. In order to avoid this the precipitating liquid is added progressively with intense agitation to obtain a perfect mixture and to break up the lumps of acetate which have the tendency to form in proportion to the precipitation. Then the precipitated mass is washed, dried and reduced to pulp. A cellulose acetate is finally obtained in the form of chips having more or less salient edges, such as cellulose acetate usually used in commerce, containing a certain percentage of pulverized acetate which presents certain inconveniences, such as those occasioned by losses during the ultimate manipulations. Finally it is necessary to use a large quantity of water for the washing which augments the difficulty of recovering the solvent.

The present invention has for its object a process and equipment for the automatic precipitation in the form of small grains of material dissolved in more or less thick colloidal solutions.

This process and apparatus which permits the recovery of a large part of the solvent contained in the colloidal solution are particularly useful for the precipitation of cellulose derivatives such as cellulose acetate, cellulose acetate-propionate, cellulose propionate, cellulose acetate butyrate or cellulose butyrate or synthetic resins and the like.

The process according to the invention is remarkable notably in that it consists, after having given to the colloidal solution being precipitated a suitable viscosity by the addition of an appropriate diluent, in the passing into the precipitating liquid of this colloidal solution in the form of small drops perfectly separated.

The small drops coagulate into nearly perfect spheres which are deposited by gravity in the bottom of the vessel containing the precipitating liquid.

These small spheres are dried, after the necessary washings to extract the solvent which may still be contained therein, (the drying transforms them into pseudo-spherical grains having dimensions a little more slight).

The apparatus for the application of the said process comprises the following combination: a vessel containing the colloidal solution to be precipitated and in which the bottom is arranged in a way to permit a draining of the liquid in the form of small drops and a second vessel in which the drops fall. This second vessel is adapted for continuous draining and is kept filled up with the precipitating liquid so that the content of solvent in the precipitating liquid remains below the determined proportion.

The invention includes as well the granular precipitate obtained (cellulose acetate or other cellulose derivative, synthetic resins and other material which may be the solute in a colloidal solution).

Other characteristics and their resulting advantages are apparent from the description which follows.

In the attached drawing, given only as exemplary:

Figure 1 is a diagrammatic view of a vertical section of an apparatus according to the invention; Figure 2 is a view on a large scale of a dripping tank; Figure 3 is half of a plan view thereof; Figure 4 is part of a vertical section on a large scale; Figure 5 is a diagram of an apparatus for a cascade treatment.

According to the procedure represented by Figures 1 to 4, the apparatus consists of a dripping tank 1 for drawing off the drops of the colloidal solution arranged above the precipitation tank 2.

The tank 1 may be for example, of aluminium. Instead of aluminium an alloy of the type described in U. S. Patent Number 1,840,404 of Malm may be employed for this tank or for any of the other apparatus employed in the present invention.

Some apertures 3 (Figure 4) a few millimeters in diameter, are pierced in the bottom 4 of said tank.

At a small distance above the bottom of the tank, for example a few centimeters, is placed a false-bottom 5 (Figures 1-2-3-4) maintained for example by a central support 6 which may be regulated as to height. This false-bottom, having smaller diameter than the bottom 4 is also pierced with holes 7 in relation to the holes 3 of the bottom 4. Rods 8 in the form of pins are inserted in the two holes 3 and 7, the rod being more than two or three centimeters under the bottom 4.

The relation of the diameters of the holes 3 to the diameters of the rods 8 is for example between 8/5 and 4/3 to assure a suitable opening for the formation of the drops.

The distance from the dripping tank 1 to the precipitation tank 2 may be varied; it may, for example, be of the order of 10 centimeters.

The precipitation tank 2 may also preferably be of aluminium. Its diameter is a little larger than that of the dripping tank; its height may be relatively great, depending on its diameter for the quantity of precipitated material which I may collect.

A discharging apparatus for the precipitated material may be present in the tank 2 to avoid the stopping of the precipitation.

At the top of the tank, at 9, is provided a regulated admission tube for the precipitating liquid. In the bottom is provided a regulated discharging tube 10 for the precipitated liquid charged with solvent; a recipient 11 collects the liquid.

A specific example embodying the present process with this apparatus or other similar apparatus is given below. For this example a precipitation of cellulose acetate is given.

The usual colloidal solution of cellulose acetate to be precipitated is the completed reaction mixture in which the cellulose acetate has been ripened to a state of acetone solubility. This paste is diluted with aqueous acetic acid to introduce the desired viscosity, so that the concentration of the cellulose acetate therein may be lower than 10%. I may take advantage of this addition by also adding an agent which neutralizes the sulfuric acid in the acetylation bath in order to stop the ripening. The neutralizing agent may be for example sodium acetate, sodium carbonate, etc.

I may for example add a quantity of aqueous acetic acid of about 35% concentration, so that finally the colloidal solution will possess the following composition:

| | |
|---|---|
| Cellulose acetate | 6.81 |
| Acetic acid | 54.77 |
| Water | 38.42 |
| | 100.00 |

The viscosity of the dispersion was measured by the falling ball method with the following results:

*Height or fall: 25 centimeters—Temperature: 20° C.*

Steel ball of 1.5 mm_____Time of fall 44 seconds
Steel ball of 4 mm_____Time of fall 14 seconds One should not vary much from the preceding acetic acid-water ratio which is around 1.40. A stronger acetic acid starts coagulation, a larger proportion of water gives a false solution in which the viscosity is apparently augmented.

The colloidal solution of cellulose acetate is poured in the draining tank 1.

In operation, the liquid passes between the two bottoms 4—5 and runs out in the annular interval between each pin 8 and the edge 3 of the corresponding hole. A liquid casing follows the pin 8 and assembles again in little drops at the point. Then the drop detaches itself and falls in the tank 2.

The drops coagulate into spheres in the water and fall to position 12 in the bottom of tank 2. The acetic acid of the colloidal solution is diffused through the water 13 by which the concentration in acetic acid is augmented. By suitably regulating the addition of pure water 9 and the removing of acetic acid at 10 in accord with the flow of the colloidal solution, I can maintain the concentration of the precipitation liquid fairly constant. Nevertheless, it is necessary that the aqueous acetic acid should not surpass 38% concentration, at which the spheres will have a tendency to agglomerate.

I may stop the precipitation when the layer of cellulose acetate grains are a short distance from the upper edge of the tank 2. This distance may be twenty centimeters; it is then quite sufficient to assure the coagulation as the pure water arrives at the top.

The dimensions of the draining and precipitation tanks may be according to the importance of the manufacture and nature of the material being precipitated.

The flow of the apparatus may be varied by acting on the viscosity of the colloidal solution, on its pressure to the level of the holes 3 from the bottom of the tank 1, on the number of holes 3 and on the dimension of the draining sections. The pressure may be changed either by making the height of the column containing the colloidal solution in the tank 1 vary, by exercising a pressure on this solution or by the two means combined.

It has been indicated above that the acetic paste is, before being drawn, diluted with water titrating 35% acetic acid. By using an aqueous acetic acid having a concentration of 35% all unnecessary precipitation of the acetate is prevented. I may use however an acid of some other dilution recognized as suitable or even pure water but the addition of the latter is more difficult of accomplishment.

The collected cellulose acetate is dried after a washing which extracts the last trace of acid.

The particles of dried cellulose acetate (or other product) do not retain the same spherical shape they have when precipitated. If the coagulated balls have a moistened diameter of three millimeters, in the dry state they become pseudo-spherical granules having a diameter of around one millimeter.

The granules do not emit any dust during handling; the loss during use is very small. Among other things, these spongy and spherical granules dissolve more rapidly than the same product in powder or chip form. For instance in the case of cellulose acetate, if I desire to prepare a solution having 20% acetone without agitation, I calculate the time necessary to form a solution to be three to four hours with granular acetate and about five or six with acetate in powder form.

Other advantages are apparent from the product obtained, and the process also presents many improvements, notably because the manipulations are reduced to the minimum.

In addition, the process permits the recovery of almost all the solvent contained in the collodion. In fact, if the liquid accumulated in 11 is collected, and if the liquid remaining in the tank 2 is added thereto as well as the liquid obtained by centrifuging before drying, the weight of the mixture in solvent is very high and almost 95% of solvent may be recovered.

The process according to the invention takes into consideration a recovery method for the solvent contained in the dispersion.

Figure 5 illustrates a precipitation apparatus in accordance with the present invention comprising a battery of two precipitation cells. If cellulose acetate is to be separated from its reaction mixture in which it is dissolved this combination might be operated as follows:

The first precipitation cell $C^1$ is supplied with water, preferably of substantial purity, by water line 9 and the esterification mixture containing the cellulose acetate in solution may be supplied by means of the pipe line 14 which mixture or "dope" is precipitated in the manner described above. A leakage or flowing of the water in cell $C^1$ which may contain approximately 18% of acetic acid is allowed by line 16 from the lower portion of cell $C^1$ and then thru line 17 towards the second precipitation cell $C^2$ to supply that cell therewith. The liquid in cell $C^2$ which comprises aqueous acetic acid of about 35% concentration is withdrawn continuously thru line 18. Part of this aqueous acid is directed thru 19 towards the apparatus for diluting the mixture or dope to be precipitated and the other part thru line 20 to the apparatus for recovering the acetic acid therefrom.

The cell $C^1$ is kept full of water containing about 12% acetic acid. The liquid which is obtained by centrifuging the cellulose acetate before drying it is returned to $C^2$ and at the same time some of the liquid in cell $C^1$ is drawn off thru 21 and run into cell $C^2$.

The cell $C^2$ is supplied with the solution of cellulose acetate to be precipitated by line 23. This cell contains 33% aqueous acetic acid which liquid is drawn off at 22 and sent to the recovering apparatus as is also done with the aqueous acetic acid from the centrifuging of the acetate collected in $C^2$. The major portion of the aqueous acetic acid sent to the recovery apparatus has a concentration of acetic acid of approximately 33–35%.

Obviously in the present invention other precipitants than water such as an alcohol, benzene, carbon tetrachloride, or a higher ether (the use of which for precipitation of cellulose esters is disclosed and claimed in Malm and Fordyce application Serial No. 553,646) may be employed.

It is to be understood that the method of precipitation disclosed and claimed herein may be employed not only for separating a cellulose derivative from its colloidal solution, whether it be a spent esterification mixture or its solution in an organic solvent generally, but is applicable also for separating any solid material which may form the solute of a colloidal solution from that solution, such as synthetic resins, caoutchouc, bituminous material or other like materials. Those materials which are designated as plastic may be satisfactorily separated from their colloidal solutions by the present invention.

I claim:

1. A process for precipitating a cellulose derivative from its solution in an organic solvent which comprises passing the solution through small perforations containing rods or pins, the ratio of the diameters of the perforations to the diameters of the rods or pins being between 8/5 and 4/3, whereby the cellulose derivative solution is formed into small separated drops and then passing these drops in separated condition into a precipitant to obtain the cellulose derivative in the form of small, uniformly-sized, approximately spherical particles.

2. A process for precipitating a cellulose derivative from its solution in an organic solvent which comprises passing the solution through small perforations containing rods or pins, the ratio of the diameters of the perforations to the diameters of the rods or pins being between 8/5 and 4/3, whereby the cellulose derivative solution is formed into small separated drops and then passing these drops in separated condition into a precipitant initially consisting essentially of water to obtain the cellulose derivative in the form of small, uniformly-sized, approximately spherical particles.

3. A process for precipitating a cellulose acetate from its solution in an organic solvent which comprises passing the solution through small perforations containing rods or pins, the ratio of the diameters of the perforations to the diameters of the rods or pins being between 8/5 and 4/3, whereby the cellulose acetate solution is formed into small separated drops and then passing these drops in separated condition into a precipitant to obtain the cellulose acetate in the form of small, uniformly-sized, approximately spherical particles.

4. A process for precipitating a cellulose derivative from its solution in an organic solvent which comprises passing the solution through small perforations containing rods or pins, the ratio of the diameters of the perforations to the diameters of the rods or pins being between 8/5 and 4/3, whereby the cellulose derivative solution is formed into small separated drops and then passing these drops in separated condition into a precipitant which is maintained at approximately constant concentration to obtain the cellulose derivative in the form of small, uniformly-sized, approximately spherical particles.

LOUIS ETIENNE CLEMENT.